United States Patent
Whitehouse

(12) 
(10) Patent No.: US 6,286,438 B1
(45) Date of Patent: Sep. 11, 2001

(54) BAFFLE PLATE ASSEMBLY

(76) Inventor: Michael Philip Whitehouse, 4304 Winter Park Dr., Louisville, KY (US) 40218

(*) Notice: Subject to any disclaimer, the term of this patent is extended or adjusted under 35 U.S.C. 154(b) by 0 days.

(21) Appl. No.: 09/548,125

(22) Filed: Apr. 12, 2000

(51) Int. Cl.$^7$ ............................................. B61D 5/00
(52) U.S. Cl. .............. 105/358; 105/377.01; 105/377.08; 137/177; 137/347
(58) Field of Search .................. 105/377.01, 377.08, 105/358; 137/177, 347

(56) References Cited

U.S. PATENT DOCUMENTS

| | | | | |
|---|---|---|---|---|
| 3,884,373 | * | 5/1975 | Archibald | 214/83.28 |
| 4,184,663 | * | 1/1980 | Rollins et al. | 251/144 |
| 4,542,764 | * | 9/1985 | Brittingham et al. | 137/347 |
| 4,889,160 | * | 12/1989 | Sheets | 137/588 |
| 5,110,086 | | 5/1992 | Meuleman . | |
| 5,113,837 | | 5/1992 | Faull . | |
| 5,489,385 | * | 2/1996 | Raabe et al. | 210/448 |
| 5,536,303 | | 7/1996 | Ebeling . | |
| 5,836,351 | * | 11/1998 | Underwood | 137/587 |

* cited by examiner

Primary Examiner—S. Joseph Morano
Assistant Examiner—Frantz F. Jules

(57) ABSTRACT

A baffle plate assembly for reducing the amount of corrosive liquid contained within a railroad car from contacting a pressure relief valve connected to the railroad car. The baffle plate assembly includes a baffle body having one end connected to an upper plate and the other end connected to a lower plate. The baffle body includes a plurality of slotted openings and radially extending downwardly sloped drainage openings. The lower plate includes a radially extending downwardly sloped drainage surface that further includes a plurality of channels for draining liquid out of the baffle body. The baffle plate assembly is connected to the railroad car adjacent to the pressure relief valve such that air and/or other gases pass through the baffle plate assembly and then the pressure relief valve. Air and/or other gases pass from within the railroad car through the plurality of slotted openings defined in the baffle body into an interior chamber of the baffle body. The air and/or other gases then pass from the interior chamber of the baffle body to the pressure relief valve. The slotted openings reduce the amount of corrosive liquid passing through the baffle plate assembly as a result of splashing and sloshing of the corrosive liquid within the railroad car. Corrosive liquid that does enter the interior chamber of the baffle body drains out of the interior chamber of the baffle body through the plurality of radially extending downwardly sloped drainage openings and lower plate channels.

22 Claims, 5 Drawing Sheets

BAFFLE PLATE ASSEMBLY

BACKGROUND OF THE INVENTION

The present invention relates generally to baffle plate assemblies used in railroad cars. More particularly, this invention pertains to baffle plate assemblies operative to pass air and/or other gases therethrough while reducing the amount of liquid passing therethrough.

The railroad car industry has a need for a baffle plate assembly that may be used in conjunction with a pressure relief valve to allow air and/or other gases (the combination of air and/or other gases shall hereinafter be referred to simply as "gases") to pass out of a railroad car while reducing the amount of corrosive liquid passing from inside the railroad car into contact with the pressure relief valve. The railroad industry transports corrosive liquids across the country using railroad cars having pressure relief valves and baffle plate assemblies on a regular basis. During transport, the railroad cars are exposed to changing environmental conditions, such as heating by sunlight from the sun, and, as a result, pressure builds up inside of the railroad cars. The pressure build up is due to gases released by the corrosive liquid due to heating or other changing environmental conditions. The pressure relief valve is necessary to release the pressure build up before the railroad car is damaged. The pressure relief valve allows the gases to pass out of the railroad car, thereby reducing the pressure inside the railroad car.

The pressure relief valves used in railroad cars are susceptible to and may become damaged by contact with corrosive liquids. To prevent damage to the pressure relief valves, the railroad car industry positions the pressure relief valve in an upper portion of the railroad car separated from the corrosive liquid by an air space. However, when a railroad car transporting corrosive liquid comes to an abrupt stop, as is the case when two railroad cars are connected together, the corrosive liquid contained within the railroad car is sloshed back and forth. As a result of the sloshing motion, some of the corrosive liquid splashes onto the pressure relief valve.

To reduce the amount of corrosive liquid contacting the pressure relief valve due to sloshing and splashing, baffle plate assemblies are installed in the railroad cars between the pressure relief valve and the corrosive liquid. These baffle plate assemblies are designed to pass the gases to the pressure relief valve and out of the railroad car while minimizing the amount of corrosive liquid passing through into contact with the pressure relief valve.

Referring to FIG. 1, there is shown a baffle plate assembly currently in use in railroad cars. This baffle plate assembly is manufactured from HDPE and includes a first plate, a cylindrical member, and a second plate. Similar versions of this baffle plate assembly are manufactured out of stainless steel and fiberglass. The cylindrical member includes a plurality of circular openings for passing air and/or other gases therethrough and a plurality of drainage openings for draining liquid out of the cylindrical member. Although this baffle plate assembly does reduce the amount of corrosive liquid contacting the pressure relief valve to some extent, some corrosive liquid still passes through into contact with the pressure relief valve. As a result, the pressure relief valve is damaged and must be replaced. Replacement of damaged pressure relief valves is expensive and increases operating costs for the railroad industry. There is no other known baffle plate assembly that may be used to further minimize the amount of corrosive liquid contacting the pressure relief valve.

Thus, what is needed, then, is a baffle plate assembly that further reduces the amount of splashing corrosive liquid passing therethrough while allowing gases to pass therethrough. Such a baffle plate assembly would further protect the pressure relief valve from damage, thus reducing replacement costs and extending the useful lifetime of the pressure relief valve.

SUMMARY OF THE INVENTION

According to the present invention, there is provided a baffle plate assembly that allows gases to pass therethough, but reduces the amount of splashing corrosive liquid passing therethough. The baffle plate assembly of the present invention includes an upper plate, a baffle body, and a lower plate. The upper and lower plates may be connected to the baffle body using butt welding. The baffle body is a cylindrical tubular body having a circumferential outer wall and a wall thickness. The baffle body further includes a plurality of slotted openings and drainage openings. Each slot has a slot thickness and slot length that allows gases to pass therethrough while minimizing the amount of splashing corrosive liquid passing therethrough. The slot thickness is less than the wall thickness of the baffle body and the spacing between adjacent slots is greater than the slot thickness. The upper plate is used to connect the baffle plate assembly to the railroad car. The lower plate reduces the amount of splashing corrosive liquid entering the baffle body through the drainage openings and further includes a sloped drainage surface having channels defined therein adjacent to the drainage openings of the baffle body to facilitate drainage of corrosive liquid out of the baffle body.

Accordingly, it is an object of the present invention to provide a baffle plate assembly having slotted openings that allows gases to pass therethrough while reducing or minimizing the amount of splashing corrosive liquid passing therethrough.

Another object is to provide a baffle plate assembly that includes at least one group of slotted openings wherein a plurality of slotted openings are arranged parallel to each other and spaced along the length of the baffle body.

A further object is to provide a baffle plate assembly that includes four groups of slotted openings wherein each group includes a plurality of slotted openings arranged parallel to each other and spaced along the length of the baffle body.

Another object of the present invention is to provide a baffle plate assembly that includes downwardly sloped drainage holes for draining liquid out of the baffle plate assembly.

Still another object is to provide a baffle plate assembly that includes a plurality of slots having a slot thickness less than the wall thickness of the baffle body.

Another object of the present invention is to provide a baffle plate assembly including a sloped drainage surface for draining liquid out of the baffle plate assembly.

A further object of the present invention is to provide a baffle plate assembly that includes a plurality of slots wherein the spacing between adjacent slots is greater than the slot thickness.

Still another object of the present invention is to provide a baffle plate assembly having channels for draining liquid out of the baffle plate assembly.

Yet another object is to provide a baffle plate assembly manufactured using butt welding.

A still further object of the present invention is to provide a baffle plate assembly wherein each of the slots subtends an arc of less than 90 degrees about an axis extending along the length of the baffle body.

These objects as well as other objects of the present invention will become more readily apparent to those skilled in the art to which this invention pertains from a study of the preferred embodiments of the invention as set forth in the specification, drawings, and appended claims.

DETAILED DESCRIPTION OF THE INVENTION

Figure 1:
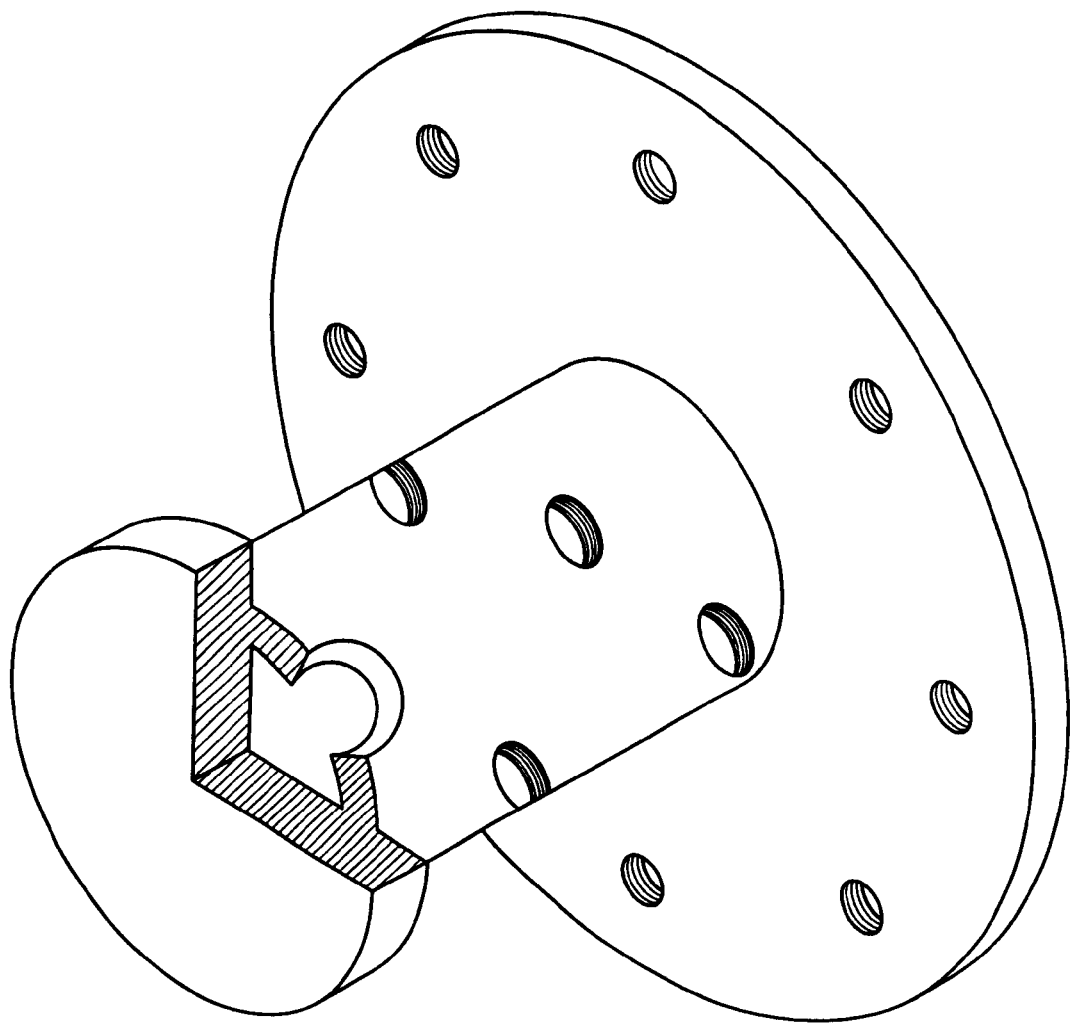
FIG. 1 is an isometric view of a baffle plate assembly currently in use in the railroad car industry.
Figure 2:
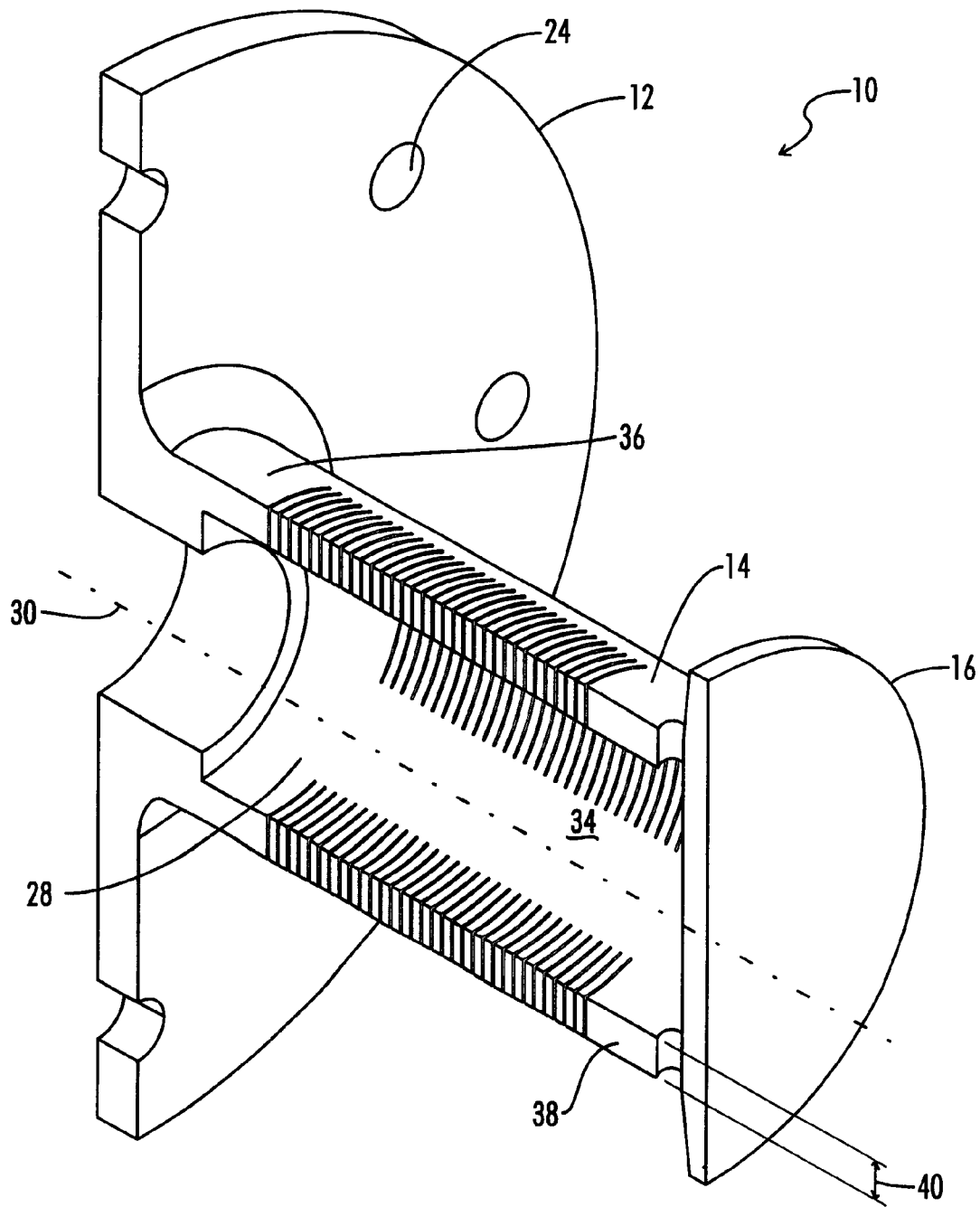
FIG. 2 is a cross-sectional isometric view of a preferred embodiment of the present invention.
Figure 4:
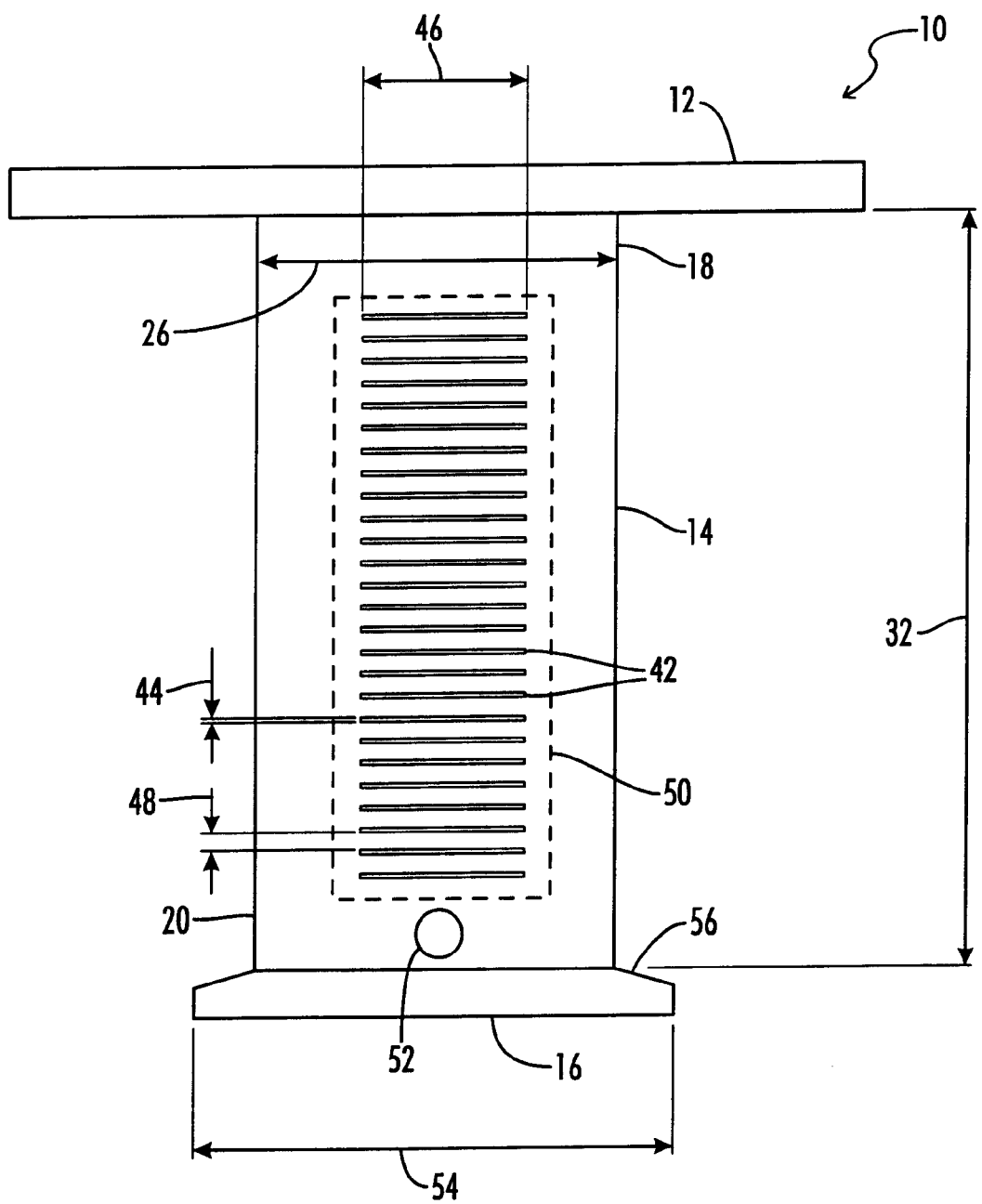
FIG. 4 is a side view of the preferred embodiment of the present invention.

Referring now to FIGS. 2 and 4, there is shown a baffle plate assembly 10 in accordance with the present invention. The assembly 10 includes an upper plate 12, a baffle body 14, and a lower plate 16. The upper plate 12 is connected to an upper end 18 (or first end) of the baffle body 14 and the lower plate 16 is connected to a lower end 20 (or second end) of the baffle body 14. In a preferred embodiment, both the upper plate 12 and the lower plate 16 are connected to the baffle body 14 using butt welding. However, other connection methods known in the art may be used as well. In addition, the upper plate 12, lower plate 16, and baffle body 14 may be constructed as a single piece using conventional injection molding techniques.

Figure 3:
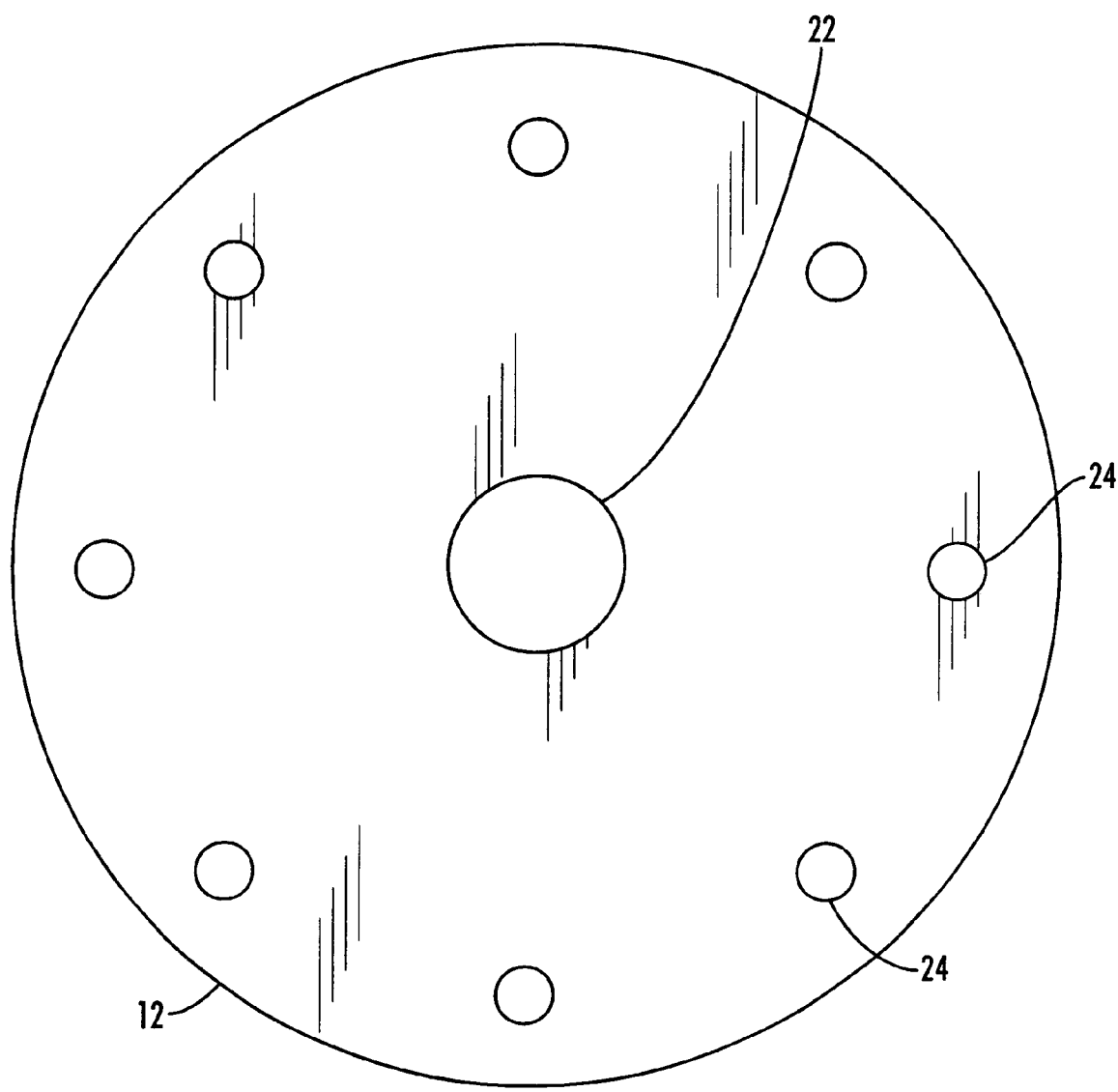
FIG. 3 is a top view of the preferred embodiment of the present invention.

Referring to FIG. 3, the upper plate 12, (also referred to as a mounting flange) includes a central opening 22 and a plurality of mounting holes 24. The central opening 22 allows gases to pass from the baffle body 14 through the upper plate 12. The holes 24 are used to mount the upper plate 12 to a railroad car 23 adjacent to a pressure relief valve 25 (see FIG. 6). Although this embodiment of the present invention uses the holes 24 to mount the upper plate 12 to the railroad car 23, other methods of mounting may be used as well. In a preferred embodiment, the upper plate 12 is manufactured out of high density polyethylene (HDPE). However, other materials, such as stainless steel, fiberglass, and rubber may be used as well.

Referring to FIGS. 2 and 4, the baffle body 14 is a cylindrical tubular body including a baffle body diameter 26, the upper end 18, the lower end 20, and a longitudinal bore 28 (or interior chamber) extending from the upper end 18 to the lower end 20. The longitudinal bore 28 includes a longitudinal axis 30 defined along the length 32 of the baffle body 14 and defines a cylindrical inner surface 34. The baffle body includes a cylindrical outer surface 36 and a wall 38 having a radial wall thickness 40 defined by the cylindrical inner and outer surfaces, 34 and 36.

The baffle body 14 further includes a plurality of slotted openings 42 (or slots) for passing gases through the baffle body 14. Each slot 42 has a slot thickness 44 and a slot length 46. The slot thickness 44 of each slot 42 extends in a direction parallel to the longitudinal axis 30 and is substantially less than the wall thickness 40. The slot length 46 subtends an arc of less than 90 degrees with respect to the longitudinal axis 30. A distance 48 greater than the slot thickness 44 separates adjacent slots 42. Each slot 42 extends outward in a plane perpendicular to the longitudinal axis 30 and radially from the cylindrical outer surface 36 to the cylindrical inner surface 34. The slots 42 may be arranged into groups 50 in which each slot 42 is parallel to and spaced apart from each other slot 42 by the distance 48 along the length 32 of the baffle body 14.

In a preferred embodiment, the baffle body 14 is manufactured from a 4 inch diameter cylindrical high density polyethylene (HDPE) pipe having a length 32 of approximately 7 inches and a radial wall thickness 40 of approximately ¼ inch. The baffle body 14 includes four groups 50 of thirty-two radially extending slots 42 for a total of 128 slots. Each slot 42 has a slot thickness 44 of 40/1000 of an inch and a slot length 46 of 1¼ inches (or an approximately 32 degree arc with respect to the longitudinal axis) when measured from the inside of the baffle body 14. The distance 48 between adjacent slots 22 is approximately ⅛ inch. Although the preferred embodiment includes four groups 50 of slots 42, the slots 42 may be arranged into fewer than four groups 50 as well.

Referring to FIG. 4, the baffle body 14 further includes a plurality of drainage openings 52 (or drain holes) at the lower end 20 of the baffle body 14 and adjacent to the lower plate 16. The amount of corrosive liquid entering the baffle body 14 through the drainage openings 52 and contacting the pressure relief valve is minimized by positioning the drainage openings 52 at the lower end 20 of the baffle body 14. In addition, the lower plate 16 includes a lower plate diameter 54 that is larger than the baffle body diameter 26 in order to further minimize the amount of splashing corrosive liquid entering the baffle body 14 through the drainage openings 52. The drainage openings 52 allow any corrosive liquid that may pass through the slotted openings 42 into the baffle body 14 to drain back out of the baffle body 14. In a preferred embodiment, the drainage openings 52 are circular and extend radially from the cylindrical inner surface 34 to the cylindrical outer surface 36. The drainage openings 52 may be positioned between the groups 50 of slotted openings 42 or may be positioned directly under each group 50. The drainage openings 52 may further slope downward as the openings 52 extend radially outward through the baffle body 14 to facilitate drainage of liquid. In a preferred embodiment, the drainage openings 52 slope downward at a 12 degree angle as the openings 52 extend radially outward through the baffle body 14.

Referring again to FIG. 4, the lower plate 16 (or bottom plate) includes a radially extending downwardly sloped drainage surface 56. The drainage surface 56 includes a plurality of channels (not shown). The lower plate 16 is connected to the baffle body 14 so that the channels 58 are adjacent to and aligned with the drainage openings 52. The positioning of the channels 58 in this manner further facilitates the drainage of liquid out of the baffle plate 14. In a preferred embodiment, the drainage surface 56 slopes downward at a 12 degree angle as the drainage surface 56 extends radially outward from the baffle body 14.

Figure 5:
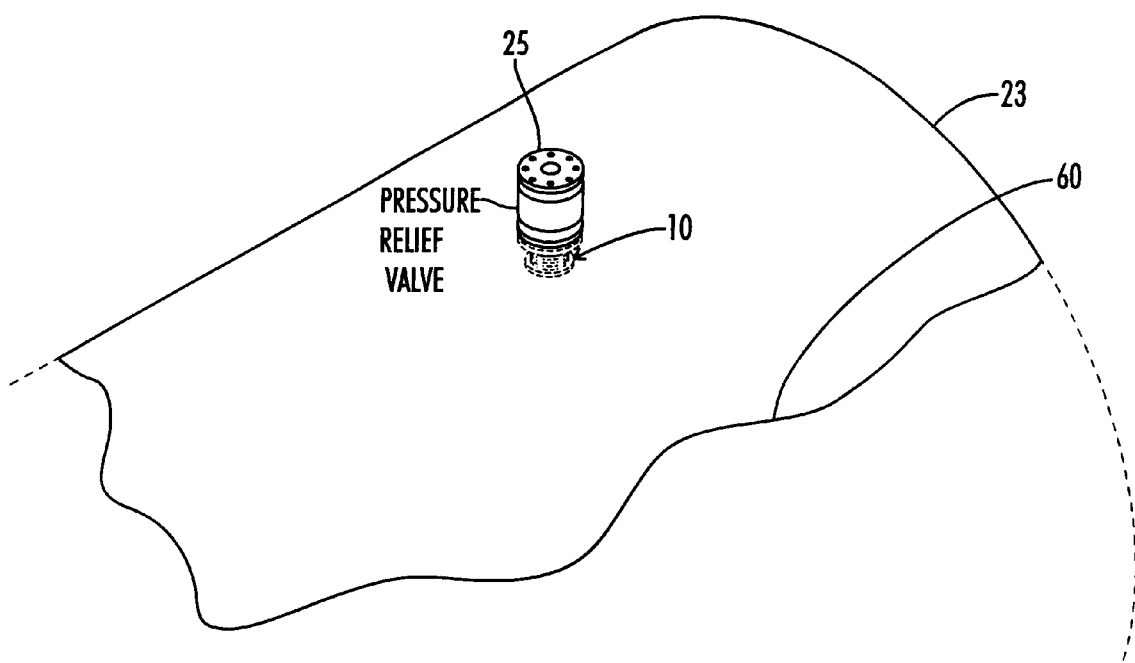
FIG. 5 is an isometric view of a railroad car equipped with a pressure relief valve and the preferred embodiment of the present invention.
Figure 6:
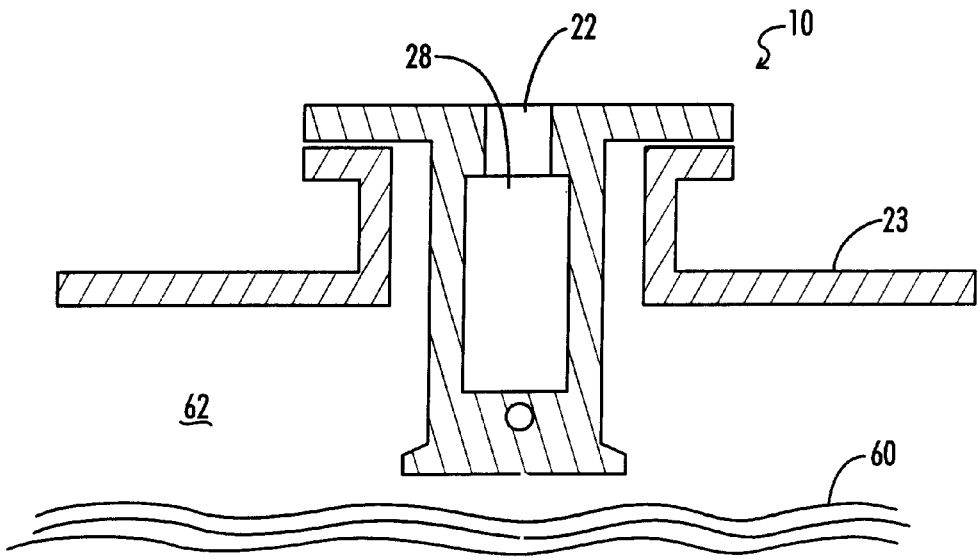
FIG. 6 is an enlarged cut-away view of the railroad car equipped with the pressure relief valve and the preferred embodiment of the present invention.

Referring to FIGS. 5 and 6, the baffle plate assembly 10 of the present invention is used in the following manner. The baffle plate assembly 10 is mounted on the railroad car 23 adjacent to the pressure relief valve 25 and extends into an interior of the railroad car. The railroad car 23 is filled with a corrosive liquid 60 leaving an air space 62 between the corrosive liquid 60 and the baffle plate assembly 10. The baffle plate assembly 10 is not submerged in the corrosive liquid 60. As environmental conditions around the railroad car change, i.e., temperature increase, pressure builds up inside the railroad car 23. This pressure must be released or the railroad car 23 will be damaged. To release the pressure inside the railroad car 23, gasses pass from the interior of the railroad car 23 through the slotted openings 42 in baffle plate assembly 10. The gases then pass through the baffle body 14 and the central opening 22 into pressure relief valve 25. Pressure relief valve 25 allows gases to pass out of the railroad car 23, thus relieving the pressure in the railroad car 23. When movement of the railroad car causes the corrosive liquid 60 to splash onto the baffle plate assembly 10, the amount of corrosive liquid 60 passing into the baffle body 14 is minimized by the slotted openings 42. Furthermore, if any of the corrosive liquid 60 does pass through the slotted openings 42 into the baffle body 14, that corrosive liquid 60 may then drain back out of the baffle body 14 through the drainage openings 52.

Thus, although there have been described particular embodiments of the present invention of a new and useful Baffle Plate Assembly, it is not intended that such references be construed as limitations upon the scope of this invention except as set forth in the following claims.

The invention claimed is:

1. A baffle plate assembly for reducing the amount of liquid contacting a pressure relief valve connected to a railroad car, comprising:
    a baffle body having a first end and a second end;
    an interior chamber defined within the baffle body;
    an upper plate connected to the first end of the baffle body for connecting the baffle plate assembly to the railroad car, the upper plate including a central opening for passing gases from the interior chamber to the pressure relief valve;
    a plurality of slotted openings defined in the baffle body for passing gases from an interior of the railroad car into the interior chamber of the baffle body and for reducing the amount of liquid passing from the interior of the railroad car into the interior chamber of the baffle body;
    at least one drainage opening adjacent the second end of the baffle body; and
    a lower plate connected to the second end of the baffle body, the lower plate including at least one channel adjacent to the drainage opening for draining liquid from the interior chamber of the baffle body.

2. The baffle plate assembly of claim 1, wherein the upper plate and the lower plate are connected to the baffle body using butt welding.

3. The baffle plate assembly of claim 1, wherein the drainage opening is sloped downward as it extends radially outward through the baffle body.

4. The baffle plate assembly of claim 1, wherein the lower plate includes a radially extending downwardly sloped drainage surface.

5. The baffle plate assembly of claim 1, wherein:
    the baffle body is cylindrical and includes a circumferential outer wall, the wall having a wall thickness; and
    the slotted openings are arranged in four groups of slots located in four quadrants of a circular cross-section of the baffle body, the slots of each group being parallel to each other and superimposed in plan view, and the slots being spaced from each other along a length of the cylindrical baffle body.

6. The baffle plate assembly of claim 5, wherein the slots have a slot thickness substantially less than the wall thickness of the cylindrical baffle body.

7. The baffle plate assembly of claim 6, wherein the spacing between adjacent slots is greater than the slot thickness.

8. The baffle plate assembly of claim 7, wherein each of the slots subtends an arc of less than 90 degrees about an axis extending along the length of the baffle body.

9. The baffle plate assembly of claim 1, wherein the baffle plate assembly is manufactured out of stainless steel.

10. The baffle plate assembly of claim 1, wherein the baffle plate assembly is manufactured out of fiberglass.

11. The baffle plate assembly of claim 1, wherein the baffle plate assembly is manufactured out of the high density polyethylene.

12. The baffle plate assembly of claim 1, wherein the baffle plate assembly is constructed from a corrosive resistant material.

13. A railroad car baffle apparatus, comprising:
    a cylindrical tubular body having an upper end, a lower end, a longitudinal bore extending from the upper end to the lower end and having a longitudinal axis, the bore defining a cylindrical inner surface, the body having a cylindrical outer surface, and the body having an outer wall defined between th e cylindrical inner and outer surfaces, the wall having a radial wall thickness;
    a mounting flange connected to the upper end of the body for mounting the apparatus on the rail car with the body extending into an interior of the rail car, the mounting flange having a central opening therein for communicating the bore of the body with a pressure relief valve mounted on the rail car;
    a bottom plate closing the lower end of the body;
    at least one drain hole adjacent the lower end of the body; and
    wherein the cylindrical tubular body has a plurality of radially extending slots extending through the wall, the slots lying in planes perpendicular to the longitudinal axis of the body, the slots allowing gas to pass therethrough while resisting the flow of splashing liquids therethrough from the interior of the railroad car into the bore of the body.

14. The apparatus of claim 13, wherein:
    the slots have a slot thickness in a direction parallel to the longitudinal axis of the body, the slot thickness substantially less than a wall thickness of the wall in a direction extending radially from the longitudinal axis.

15. The apparatus of claim 14, wherein the wall thickness is at least ten times as great as the slot thickness.

16. The apparatus of claim 14, wherein:
    each of the slots subtends an arc of less than 90 degrees about the longitudinal axis.

17. The apparatus of claim 16, wherein:
    the slots include a group of parallel slots, superimposed in plan view, and spaced apart from each other along the longitudinal axis of the body.

18. The apparatus of claim 17, wherein:

the spacing between adjacent slots of the group is greater than the slot thickness.

19. The apparatus of claim 17, wherein:

the slots are arranged in four such groups located in four quadrants of a circular cross-section of the body.

20. The apparatus of claim 14, wherein:

the slots include a group of parallel slots, superimposed in plan view, and spaced apart from each other along the longitudinal axis of the body.

21. The apparatus of claim 20, wherein:

the spacing between adjacent slots of the group is greater than the slot thickness.

22. The apparatus of claim 20, wherein:

the slots are arranged in a plurality of such groups, each group being located in a separate arcuate segment of a circular cross-section of the baffle body.

* * * * *